3 Sheets—Sheet 1.
G. H. PERKINS & G. BROWN.
Case for Supporting Cans.
No. 211,041. Patented Dec. 17, 1878.
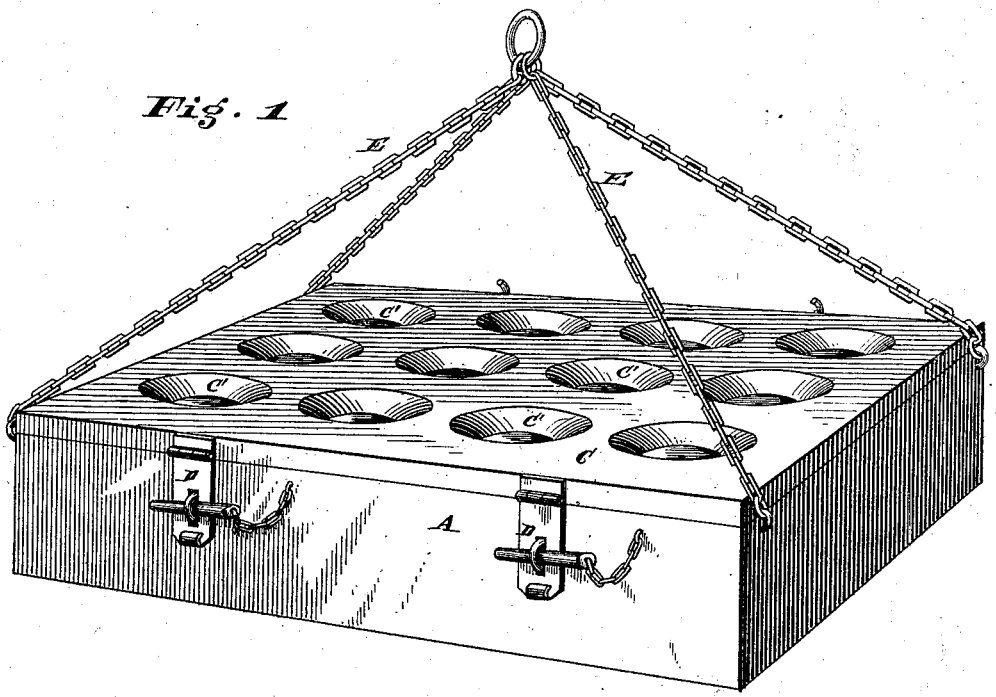
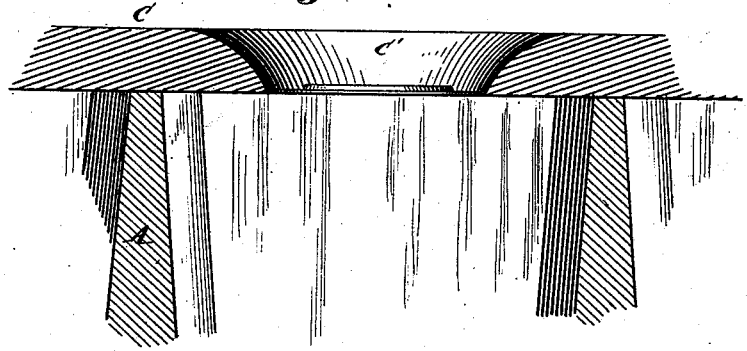
Attests
Inventors
George H. Perkins
George Brown
By their Attorneys, 3 Sheets—Sheet 2.

G. H. PERKINS & G. BROWN.
Case for Supporting Cans.

No. 211,041. Patented Dec. 17, 1878.

Attests:
Rud Hunter
John Tolley Jr

Inventors
George H. Perkins
George Brown
By their Attorneys,
W. C. Strawbridge,
J. Bonsall Taylor.

3 Sheets—Sheet 3.

G. H. PERKINS & G. BROWN.
Case for Supporting Cans.

No. 211,041. Patented Dec. 17, 1878.

Attests:
Inventors:
George H. Perkins
George Brown
By their Attorneys

UNITED STATES PATENT OFFICE.

GEORGE H. PERKINS AND GEORGE BROWN, OF PHILADELPHIA, PENNSYLVANIA, ASSIGNORS TO THE HANNIBAL MEAT CO., (LIMITED,) OF SAME PLACE, AND OF HANNIBAL, MISSOURI.

IMPROVEMENT IN CASES FOR SUPPORTING CANS.

Specification forming part of Letters Patent No. 211,041, dated December 17, 1878; application filed July 10, 1878.

*To all whom it may concern:*

Be it known that we, GEORGE H. PERKINS and GEORGE BROWN, both of the city and county of Philadelphia, in the State of Pennsylvania, have invented a new and useful Improvement in Supporting Boiling-Cases for Cans, of which the following is a full, clear, and precise description, reference being had to the accompanying drawings, which form part hereof, and of which—

Figure 2:
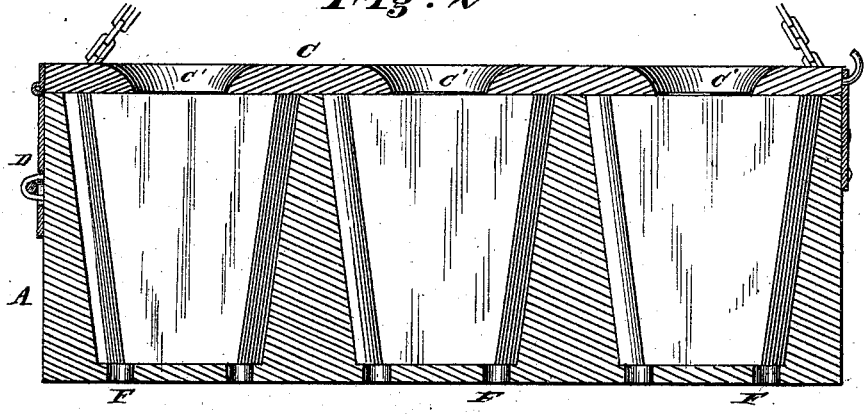
Figure 3:
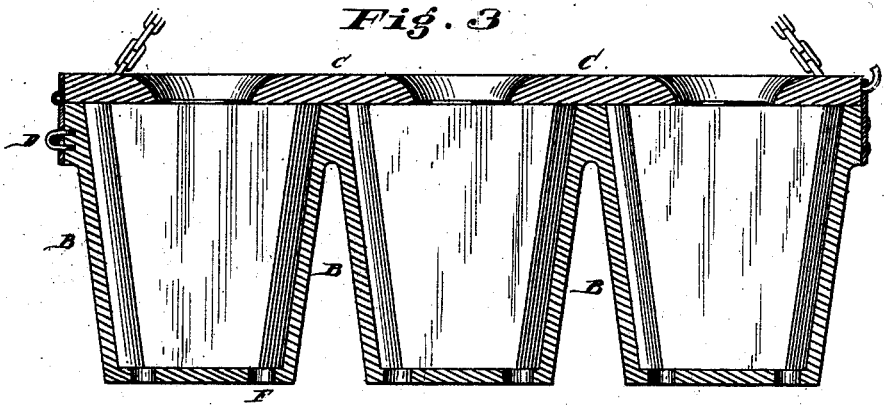
Figure 4:
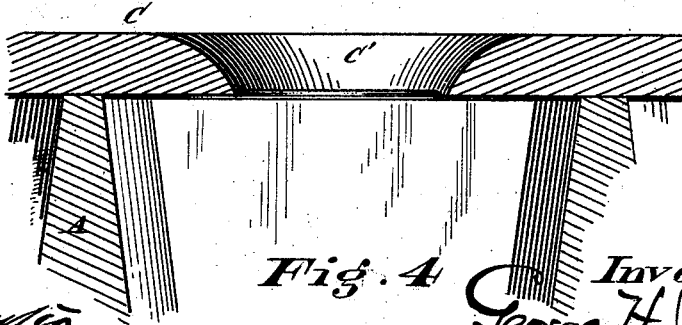
Figure 6:
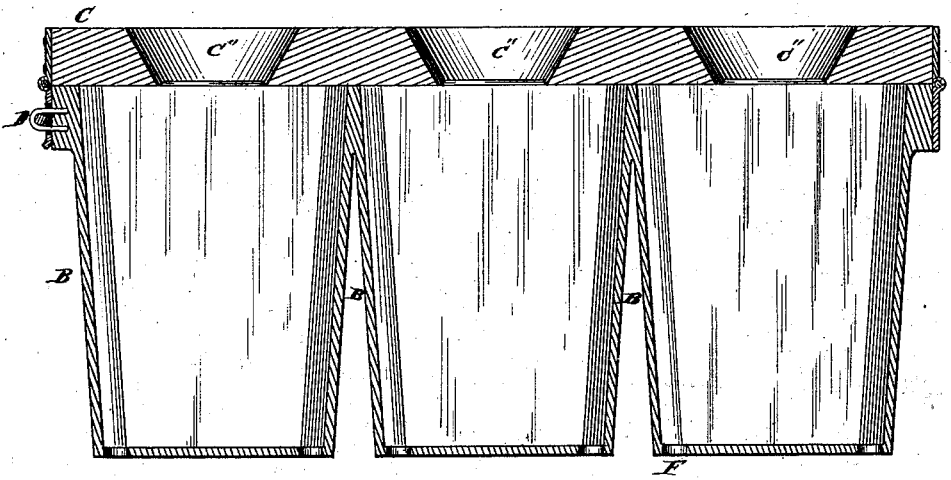
Figure 7:
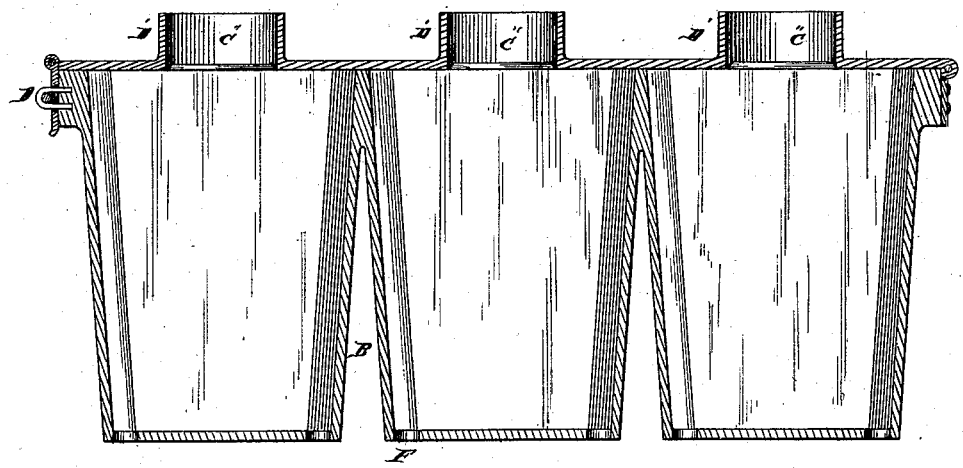

Figure 1 is a view in perspective of our improvement as suspended from the handling-crane and in readiness for immersion; Figs. 2 and 3, central longitudinal sections of two forms of construction of the case, exhibiting the cans in place, and Figs. 4 and 5 sectional details of two forms of opening in the lid, as hereinafter explained; Figs. 6 and 7, sectional details of two forms of extensions of the lid-openings, as hereinafter explained.

Similar letters of reference indicate corresponding parts.

Our invention is designed to be employed in connection with processes of preserving meats, &c., and hermetically sealing the same in cans; and consists, substantially, in the supporting boiling-case herein described and claimed, in which cans containing meat in the uncooked or partially-preserved state are placed, and, when properly secured and closed up, immersed in water and boiled to the desired degree.

Heretofore, after the meat or other substance to be preserved has been placed in the can and the cap or cover sealed on, the can with its inclosed contents has been placed in boiling water and the whole boiled for a time, then removed from the boiling water and the can punctured to allow of the escape of gases, resealed, and boiled again. Frequently the pressure generated within the can has been sufficient to burst it outright or spread the seams, to the damage of the contents. To obviate this is the object of our invention.

Our supporting-case consists of a series of cells or receptacles of the exact size of the cans to be subjected to the boiling process, arranged in any given series, and adapted to receive and support upon every side each can during the boiling, so as to guard against and prevent bursting of the cans.

In the drawings a case constructed to hold truncated-cone cans is represented. It will, however, be understood that the cells may be formed to hold square, rectangular, circular, or other shaped cans.

The case A is preferably made of iron, cast or wrought, and is constructed either as a series of cells, B B, of the desired size, united together, or else as a box divided off by partitions in such manner as to produce the cells.

In Fig. 3 is represented the first construction, in which it will be observed that the water or boiling medium has access to the space between the cans as well as above and below. In Fig. 2 is represented the second construction.

The object being to support the can against the bulging pressure, it is requisite that the sides and bottom of the cells should be correspondent with those of the can, of whatever shape the latter may be, and fit closely against them.

C is the lid, removably hinged to the case for convenience in handling, the same consisting of a metal top adapted to bear upon or protect portions of the covers of each can, leaving, however, a space for the puncturing and resealing and, when desired, for filling of the can.

The lid C is conveniently constructed as a flat cover, sufficient in its external dimensions to completely cover all the cells, and having a series of openings, C', made to correspond with the cells, each opening being best made of an outline correspondent with the cap of the can-head, and of size sufficient either just to overlap the edges of the cap, and so bear upon it, or of larger size, to permit the sealing on of the cap after the filling of the can within the cell, if desired.

The sides of the openings may be so constructed or arranged as to extend above the openings in the can and constitute chambers or vessels or extensions C'', so to speak, of the can, to the end that in the cooking process in the can ebullition or swelling of the contents can take place into the extensions without loss of material by overflow, the extensions being so formed as to facilitate the easy flow of the boiling material back into the can.

It is obvious that the lid must fit closely down upon the can, so that there shall be no escape of material between the lid and can-cover.

In Fig. 6 is represented a convenient method of forming the top extensions by making a countersunk opening in a lid of the required thickness.

In Fig. 7 is represented an extension formed by an embracing band or rim, D', erected upon a thin lid around an opening thereof.

The walls of the extension, however formed, are best inclined inwardly toward their base, so as to insure the effectual reflux of the material.

D D are locks to secure the lid in position; E E, chains, or the like, by which the case can be handled with a crane. F F are drain-holes, provided to permit the escape of water.

The case containing the filled cans, and with the cover locked on, is readily immersed in the boiling medium and removed therefrom, effectuating a most material improvement over the old processes.

The cover being in one piece, as it is best made, effects a material saving in the time necessarily consumed in the putting in and taking out of the cans.

Having thus described our invention, we claim and desire to secure by Letters Patent of the United States—

1. The supporting boiling-case herein described, consisting of a series of cells constructed and operating as described and of a cover provided with openings coincident with the cells, substantially as and for the purposes set forth.

2. In combination with a supporting boiling-case for cans consisting of a series of cells constructed and operating to support the cans upon sides and bottom, a cover adapted, when applied, to bear upon or protect the tops of the cans, and provided with a series of openings coincident with the openings in the tops of the cans, substantially as described.

In testimony whereof we have hereunto set our hands this 24th day of June, 1878.

GEORGE H. PERKINS.
GEORGE BROWN.

Witnesses:
W. C. STRAWBRIDGE,
J. BONSALL TAYLOR.